United States Patent
Tuomi

(10) Patent No.: US 6,965,562 B2
(45) Date of Patent: Nov. 15, 2005

(54) SYSTEM AND METHOD FOR MANAGING A NETWORK TO SUSTAIN THE QUALITY OF VOICE OVER INTERNET PROTOCOL COMMUNICATIONS

(75) Inventor: Jukka Tuomi, Tampere (FI)

(73) Assignee: Nokia Networks, Mountain View, CA (US)

( * ) Notice: Subject to any disclaimer, the term of this patent is extended or adjusted under 35 U.S.C. 154(b) by 644 days.

(21) Appl. No.: 09/735,516

(22) Filed: Dec. 14, 2000

(65) Prior Publication Data

US 2002/0110112 A1 Aug. 15, 2002

(51) Int. Cl.[7] .......................... H04L 12/26; H04L 12/56
(52) U.S. Cl. .................. 370/230; 370/395.21; 370/352
(58) Field of Search .................. 370/229–233, 370/252, 351, 352, 395.2, 395.21, 395.41, 395.52, 395.61, 449, 457

(56) References Cited

U.S. PATENT DOCUMENTS

| | | | | |
|---|---|---|---|---|
| 5,796,719 A | * | 8/1998 | Peris et al. .................. | 370/231 |
| 6,006,269 A | * | 12/1999 | Phaal .......................... | 709/227 |
| 6,222,824 B1 | * | 4/2001 | Marin et al. ................. | 370/230 |
| 6,363,065 B1 | * | 3/2002 | Thornton et al. ........... | 370/352 |
| 6,377,573 B1 | * | 4/2002 | Shaffer et al. .............. | 370/356 |
| 6,426,955 B1 | * | 7/2002 | Gossett Dalton et al. ... | 370/401 |
| 6,515,964 B1 | * | 2/2003 | Cheung et al. ............. | 370/230 |
| 6,529,499 B1 | * | 3/2003 | Doshi et al. ................ | 370/352 |
| 6,611,694 B1 | * | 8/2003 | Oltedal et al. .............. | 455/560 |
| 6,658,512 B1 | * | 12/2003 | Gokulrangan ................ | 710/117 |
| 6,697,364 B1 | * | 2/2004 | Kekki et al. ................. | 370/389 |
| 2004/0008627 A1 | * | 1/2004 | Garg et al. .................. | 370/235 |

FOREIGN PATENT DOCUMENTS

EP 999674 5/2000

OTHER PUBLICATIONS

V. Elek, "Admission Control Based on End–to–End Measurements" IEEE INFOCOM 2000, Mar. 26, 2000, pp. 623–630.

A. Fasbender et al, "On Assessing Unidirectional Latencies in Packet–Switched Networks" Communications, 1997, ICC 1997 Montreal, Jun. 8, 1997, pp. 490–494.

* cited by examiner

Primary Examiner—Hassan Kizou
Assistant Examiner—Gregory Sefcheck
(74) Attorney, Agent, or Firm—Squire, Sanders & Dempsey LLP

(57) ABSTRACT

A method and computer program to manage the load on a packet switched network so that the quality of VoIP transmission does not degrade with the addition of a new VoIP calls. This method and computer program determines the carrying capacity of the communications lines based on the bandwidth and TRAU frames per packet. Further, this method and computer program may determine the state of the network based on round trips times to nodes or computer gateways on the network. In either case calls are admitted only when doing do would not cause the quality of all VoIP calls to degrade.

12 Claims, 5 Drawing Sheets

SYSTEM AND METHOD FOR MANAGING A NETWORK TO SUSTAIN THE QUALITY OF VOICE OVER INTERNET PROTOCOL COMMUNICATIONS

FIELD OF THE INVENTION

The invention relates to a system and method for managing a network to sustain the quality of voice over Internet protocol (VoIP) communications. More particularly, the invention employs a system and method to alleviate or entirely prevent VoIP degradation in received transmission quality seen as a result of the volume of calls being processed at any moment in time.

BACKGROUND OF THE INVENTION

With the explosion in Internet access and usage as well as the wide spread usage of local area networks (LANs) and wide area networks (WANs) attempts have been made to use these forms of digital communications technology for voice communications known as voice over Internet protocol (VoIP). The primary benefit in using VoIP over the public switched telephone network (PSTN) is the substantial savings that can be realized in local and particularly long distance telephone bills. In addition, businesses operating LANs and/or WANs have found that they can realize a significant cost savings by utilizing their LAN or WAN instead of a more traditional private branch exchange (PBX) system. However, the quality of VoIP has proven to be inferior to that seen in the PSTN. All too often the voice transmission using VoIP is heard with gaps, delays, and noise interspersed in the conversation. At times when the network is experiencing high traffic conditions, this distortion can be so severe that a normal conversation becomes almost impossible.

Unfortunately, the cause of these voice problems is found in the very foundation of how packet switched Internet protocol (IP) networks, such as LANs, WANs and the Internet, transmit and receive information as compared to a PSTN. The PSTN was designed for optimal voice quality and provides users with dedicated, end-to-end circuit connections for the duration of each call. Circuits are reserved between the originating switch, tandem switches (if any), and the terminating switch based on the called party number. Therefore, the user in the PSTN has a dedicated communications line completely at their disposal for the duration of the call even when no information is being transmitted.

Unlike the circuit-switched PSTN, packet-switched IP networks provide virtual circuit connections between users. Bandwidth is shared for improved utilization of network capacity leading to lower costs for network users. Thus, packet switched IP networks were designed for the efficient transmission of computer data and not the transmission of sounds as they are generated. In packet switched IP networks, large volumes of data being transmitted are first divided into packets of a fixed or more often a variable length. The assembly of these packets entails the creation of a header having at least a packet sequence number, a source address, a destination address and packet size, contained therein. The individual packets containing the header and data are then transmitted, usually to a gateway server, and then to routers in the case of the Internet. The routers take the data and then transmit it to routers located closer to the ultimate destination, taking into consideration traffic conditions, until the final destination is reached. The number of packets assembled and transmitted is directly dependent on the volume of data being transmitted. Also, the route each packet takes to the destination may vary from packet to packet. Further, the number of routers a particular packet must pass through may vary based on the route taken and traffic conditions.

Therefore, since each data packet may take a different route to the destination, the sequence of arrival for each packet may not match that of transmission. Further, in the transmission process, often a data packet is lost due to corruption of the header information. When dealing with computer related data, the out of sequence arrival of packets and the loss of a packet is not a problem since the receiving computer can either wait for arrival of the packet or request retransmission of the packet if it does not arrive in a predetermined time period or when the data received is corrupted. Even in the case where a user is waiting for the downloading of graphic information, a short delay or interruption in transmission of the image is not often considered a significant problem. Even the complete loss of graphic data is not a problem since it can be retransmitted and ultimately cause only another delay. However, when conducting a telephone conversation or listening to music, even a very brief delay or interruption of reception is so disconcerting to the listener that it is completely unacceptable. Further, when the traffic on a packet switched IP network increases the more frequent these delays, interruptions and lost sounds become. Again, as traffic increases on a packet switched IP network the quality of the transmission can degrade to the point where normal voice communications is not possible.

Attempts to alleviate the delay have employed faster modems and communications lines. Further, attempts have been made to prioritize packets containing voice data so that they are serviced ahead of other types of data by routers. However, these efforts have had limited success and have not solved the fundamental problem that in packet switched IP networks as traffic increases quality will eventually suffer. No matter how fast the hardware or how sophisticated software, this fundamental problem generated by excessive volume will persist. Further, this drop off or decline in voice quality seen in a packet switched IP network is not necessarily a sloping curve. Instead, with the addition of a handful of the new active callers in a packet switched IP network the quality of transmissions may suddenly drop-off to an unacceptable level for all callers.

Therefore, what is needed is a computer program and method that can use the packet switched IP networks for voice transmission, thereby realizing a cost savings over PSTN, and mitigate or eliminate the effects heard by a listener caused by lost or delayed packets containing voice and sound data which can become acute when call volume increases. This computer program and method should be able to determine VoIP call volume and prevent or block the entry of additional callers when either a predetermined number of callers is active or when monitoring of the network indicates that voice quality may be about to drop off.

SUMMARY OF THE INVENTION

An embodiment of the present invention provides for a method and computer program for VoIP load management to assure voice quality in a packet switched network. This begins by determining a number of VoIP calls currently active in the packet switched network. The maximum number of VoIP calls the network can facilitate is determined without the loss of voice quality. The admission of a new VoIP call is allowed when the addition of the new VoIP would not exceed the maximum number of VoIP calls. The admission of a new VoIP call is blocked when the addition of the new VoIP would exceed the maximum number of VoIP calls.

Further, an embodiment of the present invention is a computer program and method for VoIP load management to assure voice quality in a packet switched network. This begins by transmitting a ping request to an originating gateway by a gatekeeper. A ping IP address is tranmitted to a destination gateway by the originating gateway. A reply is echoed to the originating gateway by the destination gateway. A round trip time is determined for the transmitting and echoing of the reply. Access of a new VoIP call to the packet switched network is allowed when the round trip time is less than a predetermined value.

These and other features of this device and method will become more apparent from the following description when taken in connection with the accompanying drawings which show, for purposes of illustration only, examples in accordance with the present invention.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Figure 1:
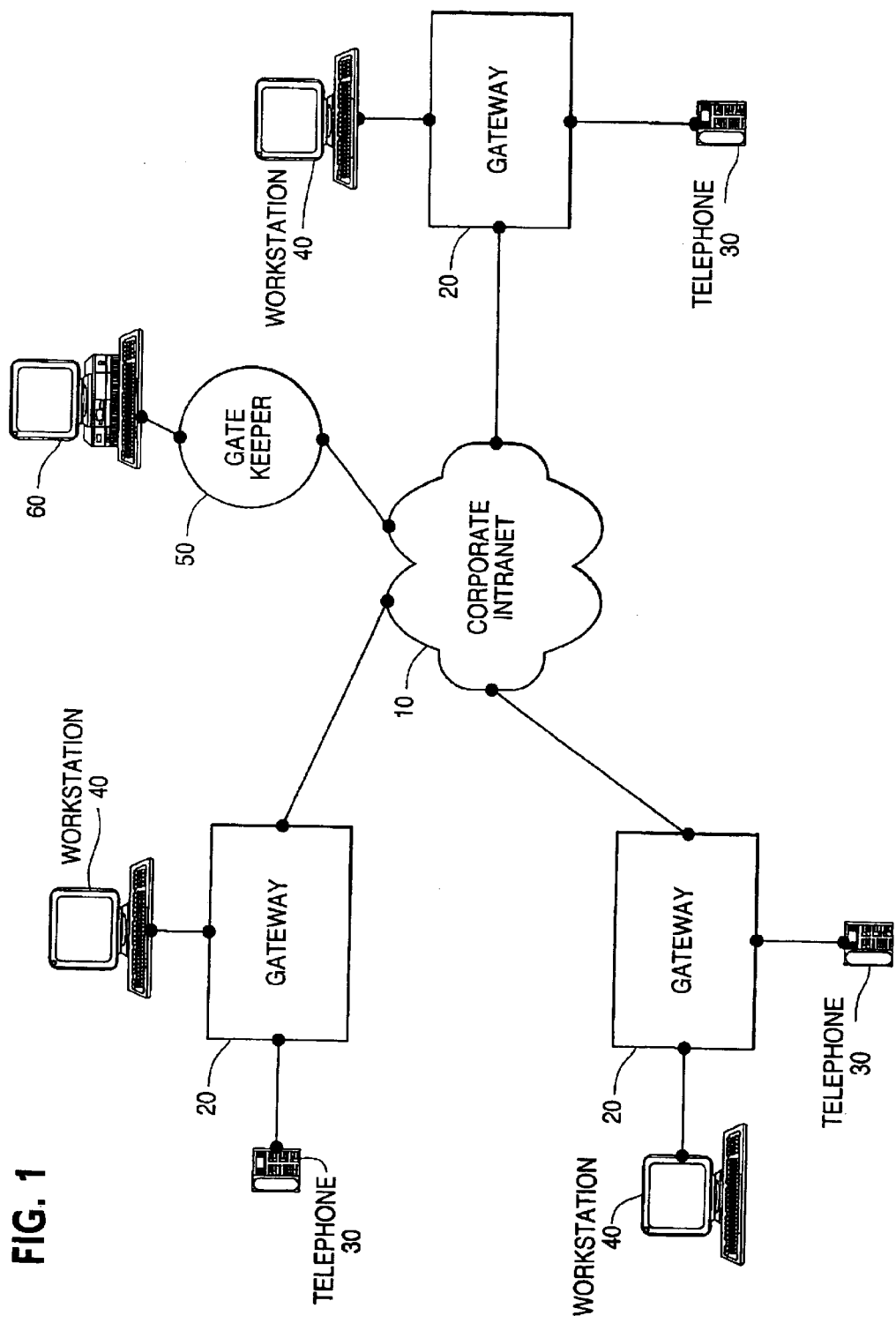
FIG. 1 is an example of an overall system diagram of an embodiment of the present invention.

Before beginning a detailed description of the subject invention, mention of the following is in order. When appropriate, like reference numerals and characters maybe used to designate identical, corresponding or similar components in differing figure drawings. Further, in the detailed description to follow, exemplary sizes/models/values/ranges may be given, although the present invention is not limited to the same.

FIG. 1 illustrates an example of an embodiment of the present invention in which phone conversations using a packet switched IP network, such as a corporate Intranet 10, are enabled. In FIG. 1, a user employs a communications device to communicate to a VoIP gateway 20. These communication devices may be a telephone 30, a voice-equipped PC (personal computer)/workstation 40 or any other device capable of transmitting sound, or sound in conjunction with video. In the case where a voice-equipped PC 40 is used, the PC would require a microphone, at least one speaker and the supporting software. Further, the user may either initiate the call or receive the call. Also, the user is not limited to contacting another human being when placing the call, but may instead contact any form of sound reproduction device including a computer.

In addition, the embodiments of the present invention may utilize and operate under a session initiation protocol (SIP) voice over Internet protocol (VOIP) network. SIP is a application layer controlled protocol that can establish, modify and terminate multimedia sessions or calls. SIP is text based using international standard organization (ISO) model number 10646 encoding throughout. This allows SIP to be flexible since it may be used to initiate multimedia conferences rather than simply delivering data. Further, the overhead involved using SIP is not significant. The syntax of the messages in SIP is similar to HTTP (hypertext transport protocol) with the exception that SIP can carry the transaction using either UDP or TCP. Further, the embodiment of the present invention may be used in any type of VOIP system. As would be appreciated by one of ordinary skill in the art, the embodiments of the present invention would have to be incorporated in the call control module of the VOIP system. Further, the element doing the call control has to be aware of the network topology so that it may keep track of the calls going through a certain link.

Still referring to FIG. 1, the VoIP gateway 20 is interfaced to the corporate Intranet 10 which is a packet switched IP network. This gateway 20 would be based on the H.323 standard which is an international standard for multimedia communications (voice, video, and data) over packet switched IP networks 10. These gateways 20 enable communications to other networks, which may be separate LANs, having their own communications devices 30 and 40. Each gateway 20 and communications devices 30 and 40 may be considered a separate pool and communicate to the corporate Intranet 10 at a different bandwidth. This packet switched IP network 10 may be the Internet, a LAN or a WAN. The communications interface between the VoIP gateway 20 and communications devices, such as telephone 30 and workstation 40, may be through any feasible mechanism to connect to a LAN or WAN and may also include accessing a PSTN (not shown). This access to a PSTN may take the form of communications lines such as standard twisted pair phone lines, coax cable and fiber optics. These communications lines may be leased lines including: T1 lines capable of transmitting at 1.54 Mbits/sec; T3 lines capable of transmitting at 45 Mbits/sec; E1 lines capable of transmitting at 2.048 Mbits/sec; and E3 lines capable of transmitting at 34 Mbits/sec. Further, the communication devices 30 and 40 may also take the form of a cellular phone, satellite phone, PC, lap top or palm computer interfaced to these communications devices.

Still referring to FIG. 1, the packet switched IP network 10 also interfaces to a gatekeeper 50 which in turn may be accessed by a system's administrator through a PC 60. This gatekeeper 50 performs two significant functions. First, address translation is accomplished by the gatekeeper 50 which enables packets to be delivered to the desired destination. Second, the gatekeeper 50 is also involved in bandwidth management. These functions enable the gatekeeper 50 to maintain a healthy state in the packet switched IP network 10. The gatekeeper also controls functions to limit the number of H.323 connections and the total bandwidth utilized by these connections.

Figure 2:
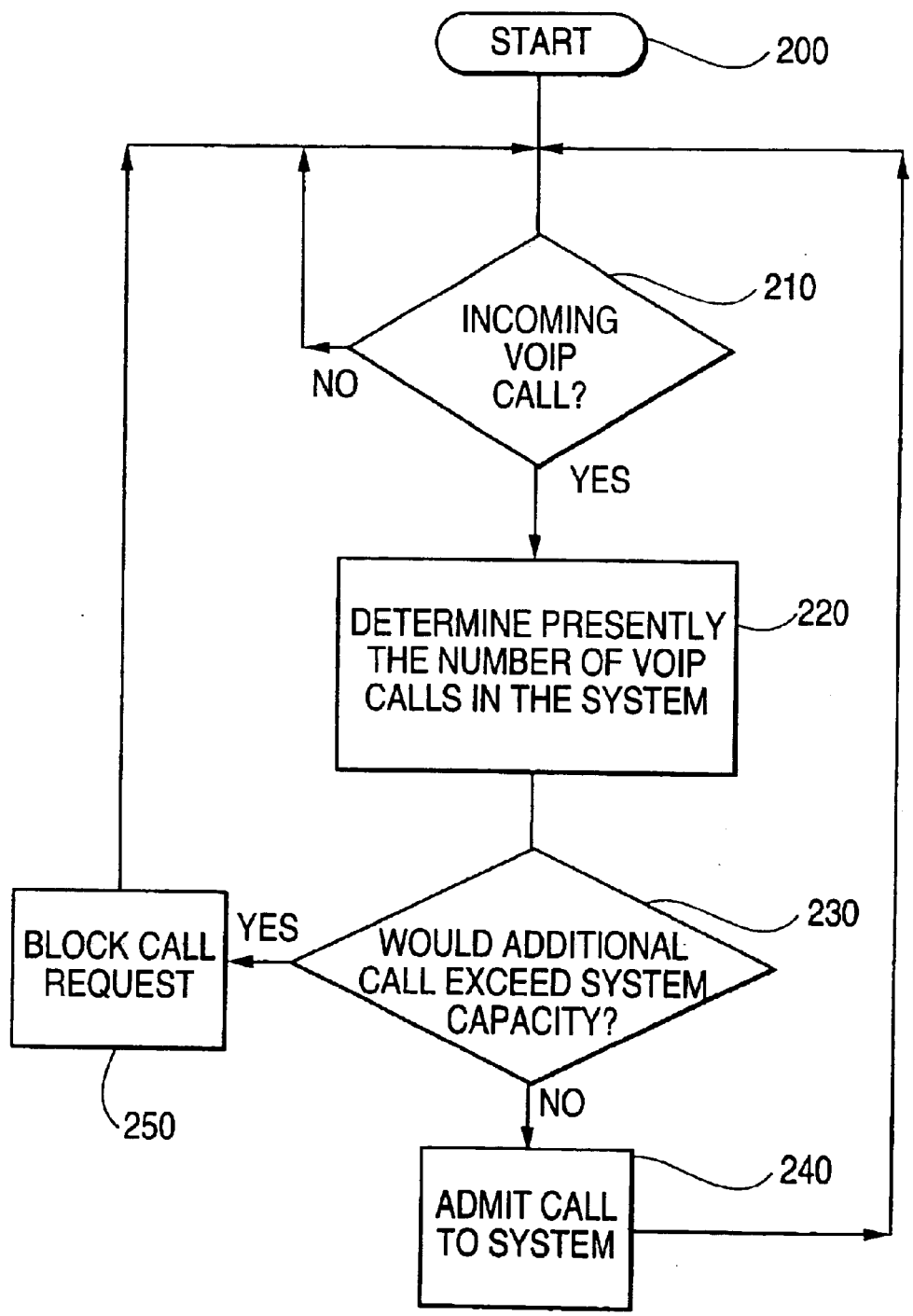
FIG. 2 is a flowchart of an example embodiment of the present invention in which the number of calls is monitored and additional calls are blocked.

FIG. 2 is a flowchart of an example embodiment of the present invention in which the number of calls is monitored and additional calls are blocked when network capacity is exceeded. The flowchart shown in FIG. 2 illustrates operations that correspond, for example, to code, sections of code, instructions, firmware, hardware, commands or the like, of a computer program that is embodied, for example, on a storage medium such as floppy disk, CD Rom, EP Rom, hard disk, etc. Further, the computer program can be written in any language such as, but not limited to, for example C++. It is envisioned that this computer program would at best partly execute on the gatekeeper 50, however, as would be appreciated by one of ordinary skill in the art, the logic presented in FIG. 2 may execute on any computer architecture that is suitable. The logic shown in FIG. 2 begins execution in operation 200 and immediately proceeds to operation 210. In operation 210, the gatekeeper 50 monitors for any incoming VoIP call coming in from any gateway 20. If no new incoming VoIP call is detected, then processing simply loops back upon itself to operation 210 and waits for a new incoming VoIP call. However, if a new VoIP call is detected then processing proceeds to operation 220. In operation 220, the number of VoIP calls coming into packet switched IP network 10 from the particular gateway 20 is determined. Thereafter, processing proceeds to operation 230 where it is determined if allowing admission of the additional call would exceed the bandwidth capacity between the gateway 20 and packet switched IP network 10.

Still referring to FIG. 2, the determination, in operation 230, whether the additional new incoming VoIP call would exceed the system capacity is based upon network loading as illustrated in table 1. Table 1 is illustrated ahead and indicates network loading in kilobits for 10, 20 and 30 calls. The number of calls a particular communications line between the gateway 20 and packet switched IP network 10 can handle is based on the number of transcoder and rate adaptation unit (TRAU) frames per Internet protocol (IP) packet. TRAU frames is simply a form of speech CODEC and any form of speech CODEC may be utilized. For example, if only one TRAU frame is permitted per IP packet and the communications link between a gateway 20 and packet switched IP network 10 is one million bps, then only a maximum of 10 calls made simultaneously occur between gateway 20 and packet switched IP network 10. However, if two TRAU frames per IP packet are permitted, then the same communications link may simultaneously enable 20 VoIP calls simultaneously.

TABLE 1

| Number of TRAU frames per IP Packet | Network Loading in kbits | |
|---|---|---|
| | 10 Calls | 20 Calls | 30 Calls |
| 1 | 728 | 1456 | 2184 |
| 2 | 496 | 992 | 1488 |
| 3 | 418 | 836 | 1254 |
| 4 | 380 | 760 | 1140 |
| 5 | 356 | 712 | 1068 |

Still referring to FIG. 2, if the addition of new VoIP call would not exceed communications ability of the communications link between a gateway 20 and packet switched IP network 10, then processing proceeds to operation 240 where the new VoIP call is admitted to the system. Thereafter, processing loops back to operation 210 where the gatekeeper 50 awaits another request for a new VoIP call to be made. However, if in operation 230 is determined that the addition of the new VoIP call would exceed the communications capacity of the links between a gateway 20 and packet switched IP network 10, then processing proceeds to operation 250 where the call is blocked and the user is requested to try the call at a later time. As with operation 240 operation 250 loops back to operation 210 to wait any additional request for new VoIP call to be made.

Figure 3:
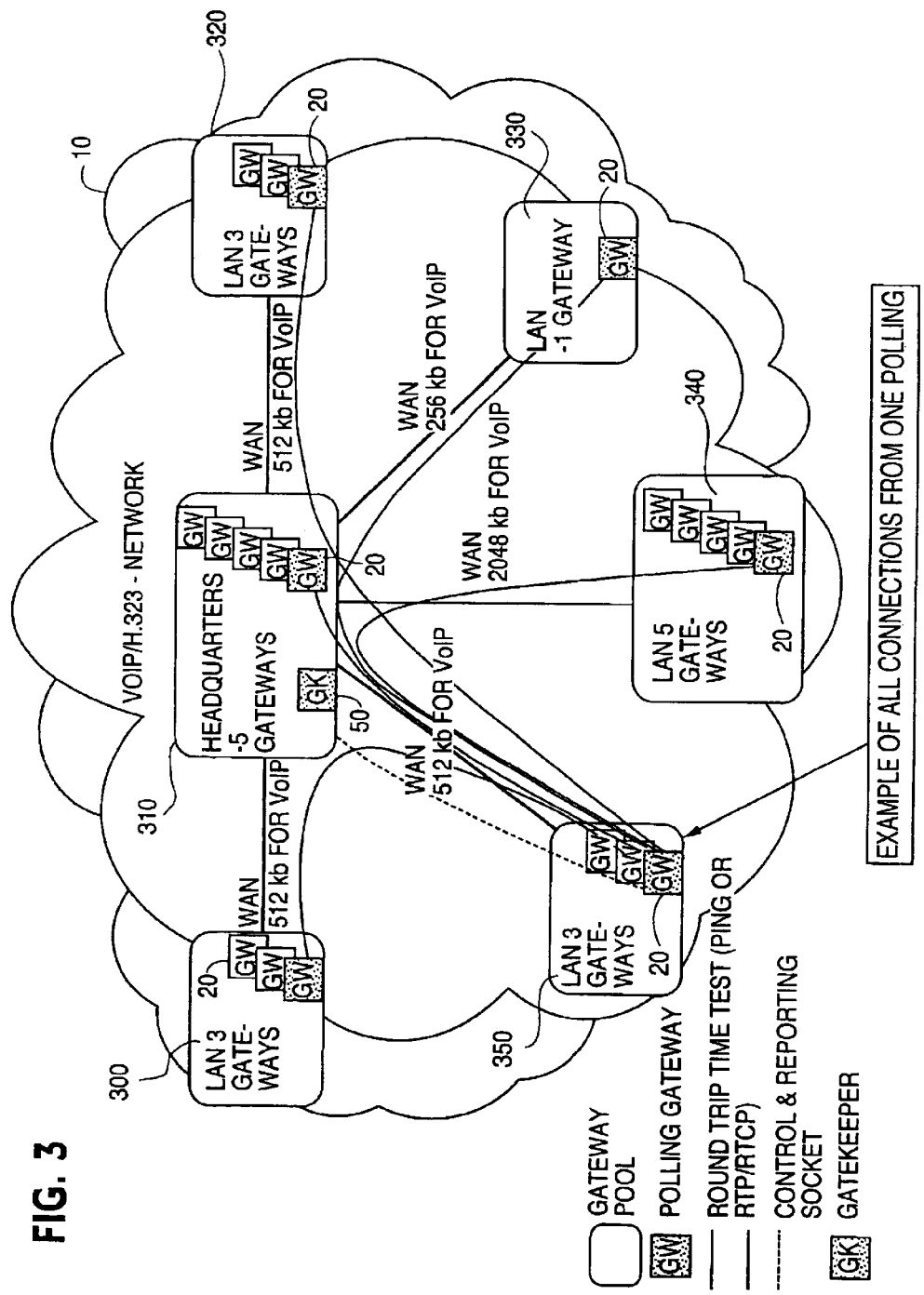
FIG. 3 is an example of an overall system diagram of an embodiment of the present invention.

FIG. 3 is an example of an overall system diagram of an embodiment of the present invention. FIG. 3 is similar to the architecture illustrated in FIG. 1 with the exception that five gateway pools 300, 310, 320, 330, 340, and 350 are illustrated. Each gateway pools 300 through 350 has a finite number of gateways 20 associated with it. For example, gateway pool 300 would contain three gateways 20, gateway pool 310 contains five gateways 20, gateway pool 320 would contain three gateways 20, gateway pool 330 contains one gateway 20, gateway pool 340 would contain five gateways 20, and gateway pool 350 would contain three gateways 20. In addition, gateway pool 310 would also contain the gatekeeper 50. As with the gateways 20 shown in FIG. 1, communications devices 30 and 40 would be attached to gateway 20. Also gatekeeper 50 would serve the functions of address translation and bandwidth management. It should also be noted that in the example embodiment shown in FIG. 3, different communications bandwidths exists between gateway pools 300 through 350. For example, gateway pools 300, 320, and 350 may communicate to and from gateway pool 310 at 512 Kbps, gateway pool 340 may communicate to and from gateway pool 310 at 2,048 Kbps, and gateway pool 330 may communicate to gateway pool 310 at 256 Kbps.

Still referring to FIG. 3, periodically gatekeeper 50 would determine the status of packet switched IP network 10 by initiating a polling operation to determine the round-trip times (RTT) between various gateway pools 300 through 350. For example, gatekeeper 50 would transmit the start of a polling or pinging sequence to a gateway 20 in gateway pool 350. Thereafter, gateway 20 in gateway pool 350 would transmit messages to a gateway 20 in each of the other gateway pools 300 through 340. In this manner, gatekeeper 50 may determine based on the round-trip times if additional new VoIP calls may be permitted between the respective gateway pools 300 through 350. Acceptable round-trip times would be directly dependent upon the bandwidth for the communications link between gateway pools 300 through 350 and call volume.

Figure 4:
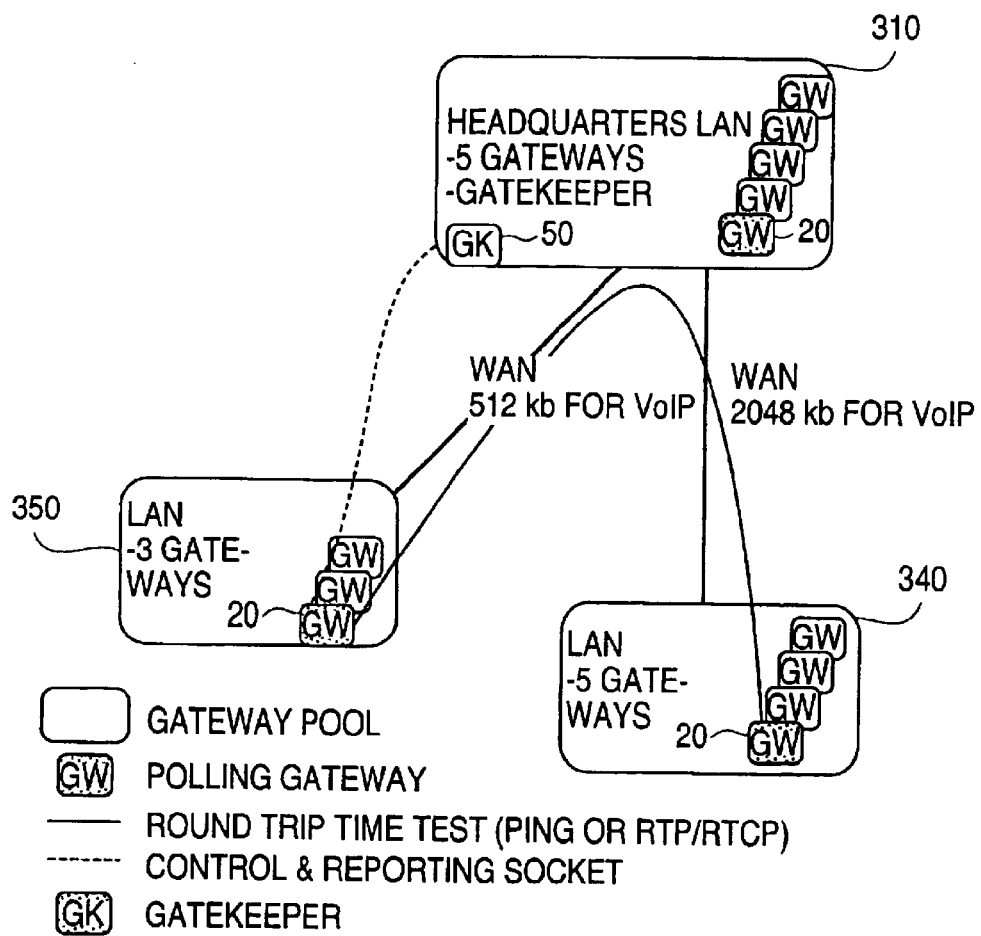
FIG. 4 is a simplified example of an overall system diagram of an embodiment of the present invention shown in FIG. 3.

FIG. 4 is a simplified example of an overall system diagram of an embodiment of the present invention shown in FIG. 3. In the example embodiment illustrated in FIG. 4 only three gateway pools are employed. These gateway pools are gateway pool 310, 340, and 350. In this case gatekeeper 50 and gateway pool 310 begins the polling or pinging process with gateway 20, designated the polling gateway, in gateway pool 350. Thereafter, gateway 20 transmits a message to gateway 20, designated the polling gateway, in gateway 340. The round-trip times for transmission and receipt of the message by gateway 20 in gateway pool 350 is determined. It should be noted that the bandwidth for the communications link between gateway pool 310 and gateway pool 340 is 2,048 kbps while the bandwidth for the communications link between gateway pool 310 and gateway pool 350 is 512 Kbps. All remaining elements of FIG. 4 are identical to those previously discussed for FIG. 3 and therefore will not be discussed further here.

Figure 5:
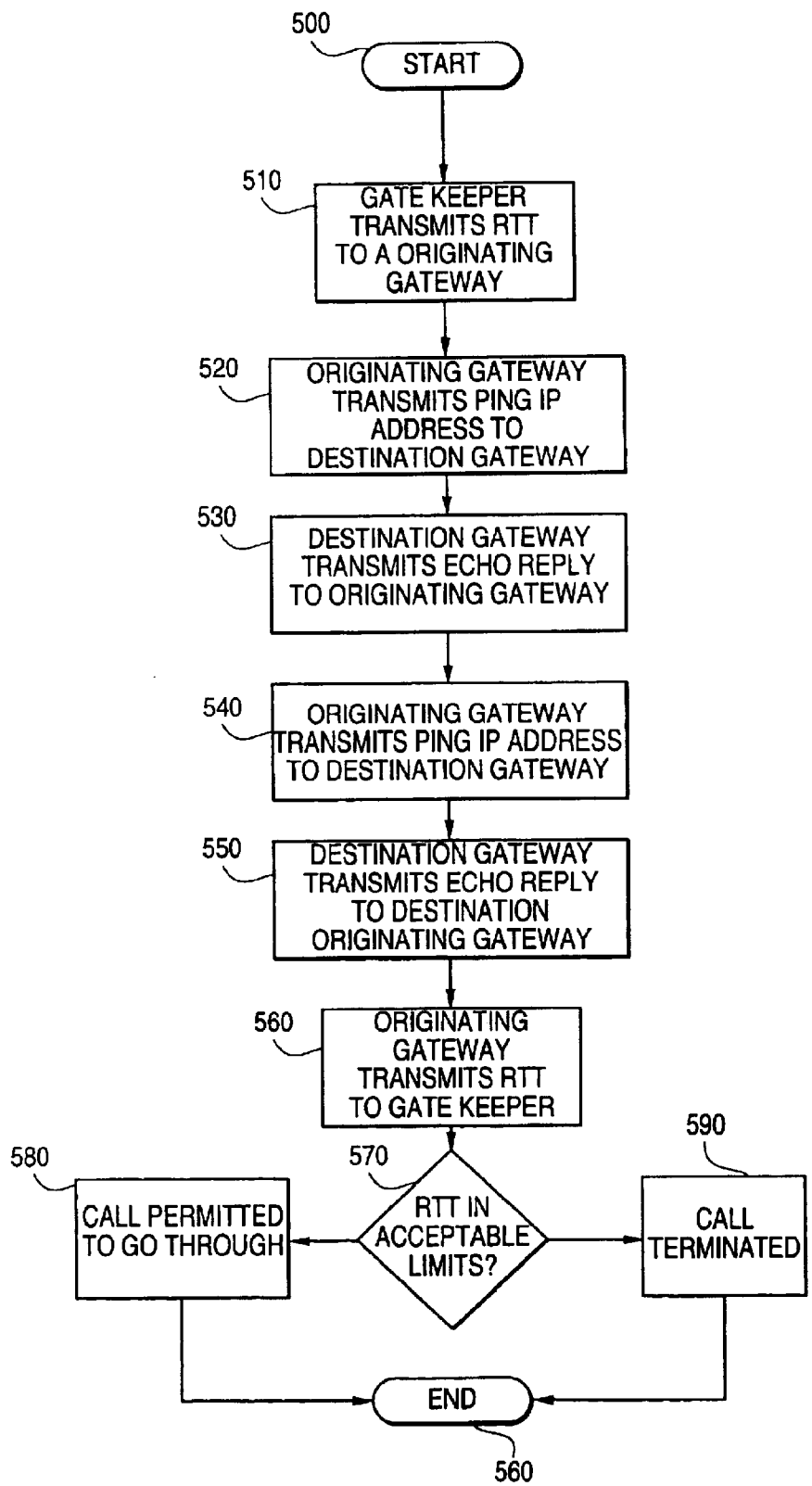
FIG. 5 is a flowchart of an example embodiment of the present invention in which the VoIP network is polled and the number of active calls is adjusted in order to maintain voice quality.

FIG. 5 is a flowchart of an example embodiment of the present invention in which the VoIP network is polled and the number of active calls is adjusted in order to maintain voice quality. The flowchart shown in FIG. 5 illustrates operations that correspond, for example, to code, sections of code, instructions, firmware, hardware, commands or the like, of a computer program that is embodied, for example, on a storage medium such as floppy disk, CD Rom, EP Rom, hard disk, etc. Further, the computer program can be written in any language such as, but not limited to, for example C++. It is envisioned that this computer program with execute at least partly on the gatekeeper 50, however as would be appreciated by one of ordinary skill in the art, the logic illustrated in FIG. 5 may execute on any computer architecture that is suitable. The logic shown in FIG. 5 begins execution in operation 500 and immediately proceeds operation 510. In operation 510, gatekeeper 50 in gateway pool 310 transmits a polling/pinging request instructions to gateway 20 in gateway pool 350. Gateway 20 in gateway pool 350 is considered the originating gateway for this polling/pinging operation. Thereafter, processing proceeds to operation 520 where the originating gateway generates a pinging IP address to gateway 20 in gateway pool 340. Gateway 20 in gateway pool 340 is considered the destination gateway in this example. In operation 530, the destination gateway generates an echo response/reply to the originating gateway. Thereafter, the round-trip times is recorded by the originating gateway and a second being IP address is transmitted to the destination gateway in operation 540. Again, in operation 550 the destination gateway transmits an echo response/reply to the originating gateway. In operation 560, the originating gateway records the round-trip times and transmits both round-trip times to gatekeeper 50. The ping operation is done twice since the first ping transmission normally takes longer than the second ping transmission. This due to the fact that the destination gateway address is not contained within the cash memory of the originating gateway upon initial transmission and therefore would take longer.

Still referring to FIG. 5, in operation 570 the round-trip times are received by the gatekeeper 50 and determine whether they lie within acceptable limits. This determination is based upon the bandwidths between the respective gateway pools involved. If gateway 50 determines that the round-trip times lie within acceptable parameters then the initiating request to place a new VoIP call is allowed in operation 580. Thereafter, processing terminates in operation 600. However, if in operation 570 it is determined that the round-trip times are not within acceptable parameters then processing proceeds operation 590. In operation 590, the request for placement of a new VoIP call is rejected and processing terminates in operation 600.

Using the example embodiments of the present invention the quality of transmissions of VoIP calls is assured and remain high-quality. Whenever the number of calls between gateway pools approaches the limits of the communication link, further calls are not permitted to enter the system. Thus, a packet switched IP network 10 begins to resemble a PSTN in that when all lines in a PSTN are being used further calls are not permitted. However, the present invention the benefits of using a packet switched IP network for VoIP calls still exist since several simultaneous calls are transmitted over the same communications link.

While we have shown and described only a few examples herein, it is understood that numerous changes and modifications as known to those skilled in the art could be made to the present invention. For example, any number of gateways and gateway pools may be utilized. Further, the logic used in the example embodiments of the present invention may reside on any computer within any gateway and on any gateway pool. Therefore, we do not wish to be limited to the details shown and described herein, but intend to cover all such changes and modifications as are encompassed by the scope of the appended claims.

I claim:

1. A method of VoIP load management to assure voice quality in a packet switched network, comprising:

determining a number of VoIP calls currently active in the packet switched network;

determining the maximum number of VoIP calls the packet switched network can facilitate without the loss of voice quality;

allowing the admission of a new VoIP call when the addition of the new VoIP call would not exceed the maximum number of VoIP calls; and blocking the admission of a new VoIP call when the addition of the new VoIP call would exceed the maximum number of VoIP calls; and wherein determining the maximum number of VoIP calls the packet switched network can facilitate without the loss of voice quality comprises determining bandwidth for a plurality of communication links between a plurality of gateway pools, determining the number of frames per IP packet used to transmit data in the packet switched network, and generating a capacity table indicating the maximum number of VoIp calls permitted to the plurality of communication links based on the bandwidth of each communication link and the frames per IP packet.

2. The method recited in claim 1, further comprising:

accessing the capacity table whenever a new VoIP call requests entry to the packet switched network.

3. The method recited in claim 1, wherein:

each gateway pool has in operation a plurality of communication devices connected to a gateway computer.

4. The method recited in claim 3, wherein:

at least one of the plurality of gateway pools has a gateway which provides address translation and bandwidth management of the VoIP calls.

5. The method recited in claim 4, wherein the gatekeeper manages access of the VoIP calls to the packet switched network.

6. The method recited in claim 1 wherein:

determining the number of frames is a number of TRAU frames.

7. A computer program embodied on a computer readable medium and executable by a computer for VoIP load management to assure voice quality in a packet switched network, comprising:

determining a number of VoIP calls currently active in the packet switched network;

determining the maximum number of VoIP calls the packet can facilitate without the loss of voice quality;

allowing the admission of a new VoIP call when the addition of the new VoIP would not exceed the maximum number of VoIP calls; and blocking the admission of a new VoIP call when the addition of the new VoIP would exceed the maximum number of VoIP calls; and wherein determining the maximum number of VoIP calls the packet switched network can facilitate without loss of voice quality comprises determining the bandwidth for a plurality of communication links between a plurality of gateway pools, determining the number of frames per IP packet used to transmit data in the packet switched network, and generating a capacity table indicating the maximum number of VoIP calls permitted for the plurality of communication link based on the bandwidth of each communication link and the frames per IP packet.

8. The computer program recited in claim 7, further comprising:

accessing the capacity table whenever a new VoIP call requests entry to the packet switched network.

9. The computer program recited in claim 7, wherein:

each gateway pool has in operation a plurality of communication devices connected to a gateway computer.

10. The computer program recited in claim 9, wherein:

at least one of the plurality of gateway pools having a gateway keeper which provides address translation and bandwidth management of the VoIP calls.

11. The computer program recited in claim 10, wherein the gateway keeper manages access of the VoIP calls to the packet switched network.

12. The computer program recited in claim 7 wherein:

determining the number of frames is a number of TRAU frames.

\* \* \* \* \*